United States Patent
Behrmann

[15] 3,658,377
[45] Apr. 25, 1972

[54] TRANSPORT VEHICLE FOR LARGE AIRPLANES

[72] Inventor: Georg Behrmann, Lauf an der Pegnitz, Germany

[73] Assignee: Dipl.-Ing. Karl Heinz Schmidt, Vorra, Hersbruck, Germany

[22] Filed: Feb. 25, 1970

[21] Appl. No.: 13,891

[30] Foreign Application Priority Data

Feb. 25, 1969 Germany ............. P 19 09 462.3

[52] U.S. Cl. ........................ 296/28 A, 214/512, 214/515
[51] Int. Cl. ........................................................ B62d 31/02
[58] Field of Search .................. 296/28 A; 214/512, 515; 254/8 C; 298/11

[56] References Cited

UNITED STATES PATENTS

| | | | |
|---|---|---|---|
| 1,953,762 | 4/1934 | Kuchar | 298/38 |
| 2,023,700 | 12/1935 | Rodler | 298/38 X |
| 2,617,547 | 11/1952 | Pridy | 214/512 |
| 2,778,674 | 1/1957 | Attendu | 296/28 A |
| 2,929,655 | 3/1960 | Hurter | 296/28 A |
| 3,105,673 | 10/1963 | Williamson | 214/512 UX |
| 3,341,042 | 9/1967 | Carder | 214/512 |

FOREIGN PATENTS OR APPLICATIONS

| | | | |
|---|---|---|---|
| 1,290,257 | 5/1962 | France | 298/11 |
| 888,123 | 1/1962 | Great Britain | 214/512 |

Primary Examiner—Benjamin Hersh
Assistant Examiner—John A. Pekar
Attorney—Holman & Stern

[57] ABSTRACT

A transport vehicle for large airplanes designed for carrying either passengers or freight and including a chassis, a platform for supporting passenger or freight carrying means, and scissors linkage operably connected to the platform for raising and lowering the platform relative to the chassis. Longerons operably associated with the scissors linkage are held in spaced relation from the roadway when the scissors linkage is collapsed and the platform rests on the chassis, with the longerons bearing on the roadway when the scissors linkage is extended and the platform is spaced from the chassis. Readily releaseable coupling means are provided for securing the platform to the chassis.

16 Claims, 6 Drawing Figures

TRANSPORT VEHICLE FOR LARGE AIRPLANES

BACKGROUND OF THE INVENTION

The instant invention relates to transport vehicles for use with large airplanes and relates more particularly to vehicles capable of transporting and loading and unloading either passengers or freight to and from an airplane.

The loading and unloading of large or giant airplanes can be effected either directly at airport terminals or dispatch buildings provided with special passenger or loading piers or on the apron of the airport. Since dispatch buildings provided with passenger or loading piers are only economical in very large airports and normally only in terminal traffic, the dispatching on the apron is still of great importance, particularly in intermediate landing operations.

Busses of preferably low floor level and freight trucks whose floor level is adapted to the respective freight conveyor plants provided in the dispatch buildings are used for bringing the passengers and/or the freight to and from the airplane. The loading and unloading of the passengers in and out of the airplane is effected over vertically adjustable stairs, preferably designed as escalators, while the loading and unloading of the freight is effected preferably by means of lift trucks.

Recently, transport vehicles with a raisable and lowerable platform have been used where the platform is provided for the transportation of passengers with a corresponding superstructure with a seating capacity and corresponding front gates for loading and unloading the passengers, while for the transportation of freight, the platform is provided with corresponding conveyors. Such transport vehicles, whose platform can be adjusted to the respective floor level of the dispatch building or of the passenger or loading deck of the respective airplane, have the advantage that the passengers can be transferred both in the dispatch building and in the airplane at the same level and that the freight can also be transferred at the same level, so that the passengers and the freight only perform horizontal movements with respect to the platform. This eliminates not only the necessity for escalators and lift trucks, but also saves costly time by eliminating the transfer of the passengers of freight.

In general, the platform of these transport vehicles is provided with a front bridge which can be inclined about a horizontal transverse axis and attached to the entrance door or the freight hatch of the airplane and which facilitates the transfer of the passengers or of the freight from the transport vehicle to the plane and vice versa. The front gates of the passenger platform superstructure of these vehicles are frequently provided with bellows to protect the passengers from inclement weather and to avoid a feeling of dizziness when the passengers move to or from the airplane with the platform raised.

As lifting means for the platform, pressure medium drives are generally used, preferably in connection with scissors-type guide gears, with the latter ensuring a greater stability of the raised platform. The lifting means and the scissors-type guide gears engage on the one hand, the chassis and, on the other hand, the platform. In view of the need for easy accessibility to the truck wheels, the bottom ends of the guide levers of the scissors-type guide gear must extend between the longerons of the chassis so that the width of the guide gear is limited to the distance available between the longerons of the chassis. This has the undesirable result that, despite the presence of additional extensible legs on the chassis, the lateral tipping stability of the vehicle with the platform fully raised, is not very great. The lateral stability of the guide gear is decreased, the smaller the supporting width of the gear. If we consider that the platform can be raised up to 5 m and more above the ground, and that the platform has to be occupied by up to 250 people in the case of passenger transfer or that a load of up to 35 t is achieved in the case of freight, and that wind velocities of over 100 km/h can occur in airports, the difficulties in such constructions will become apparent.

Another disadvantage of prior art constructions of this type is that the guide gear must work from the chassis upward resulting in the guide levers assuming an unfavorable position, particularly at the start of the lifting movement. Further, disproportionately great forces are required for raising the platform of the vehicle particularly at the start of the lifting movement.

Finally, this arrangement of the guide levers has the disadvantage that the platform is relatively high above the roadway in its lowered position because of the space above the chassis occupied by the collapsed guide gear, so that special care must be taken to ensure the loading and unloading possibility from and to the roadway by providing relatively high steps.

The basic object of this invention is to provide vehicles for large airplanes whose platform can be raised by means of scissors-type guide gears free from the foregoing and other such disadvantages. Specifically, this invention provides a more favorable supporting weight for the guide gear and a more favorable starting position at the start of the raising of the platform, as well as a very low entering and loading height respectively, with the platform in a lowered position.

SUMMARY OF THE INVENTION

This problem of the prior art is solved according to this invention by connecting the platform with the chassis by readily releasable coupling means, such that the scissors-type guide arms usually engaging the platform at their guide arm ends, engage with their other ends, longerons which are held by the guide arms in a position lifted from or above the roadway with the guide gear collapsed and the platform resting on the chassis, while with the guide gear extended and the platform lifted from the chassis, the longerons bear on the roadway. The above-mentioned longerons can be moved in vertical planes extending at both sides of the chassis outside the track, and are combined by horizontal cross-bars to provide a torsionally stiff frame.

According to a preferred embodiment of the transport vehicle of the invention, the chassis consists of two parts and in this case, the above-mentioned cross-bars connecting the longerons to define a torsionally stiff frame are arranged between the two chassis parts such that with the platform disengaged and raised, and the longerons bearing on the roadway, the chassis parts can be driven to the front or rear between the latter whereby such parts can be used for other purposes during the time passengers are moving from the vehicle into the airplane and vice versa. At least one of the chassis parts is, in this case, preferably designed as a multiple chassis or as a steering bogie, with at least one of the two chassis parts being designed as a tractor.

The readily releasable coupling means between the platform and the chassis, preferably comprise, according to the invention, on the one hand, shaft journals extending horizontally in the transverse direction of the vehicle and on the other hand bearing jaws which can be applied to these shaft journals and which embrace the latter in the coupled state in the nature of tongs.

They are preferably operatively coupled with the scissors-type guide gear in such a way that before the gear is extended the connection between the platform and chassis is automatically disengaged and, after the guide gear has been collapsed and the platform rests again on the chassis, the connection is automatically restored.

The platform can be designed as a self-supporting, torsionally stiff plate and have on one end face, a bridge that can be extended outwardly or swung out. This bridge can also be displaceable in a transverse direction relative to the platform and/or be turned relative to the latter about a vertical axis, and if necessary, also be inclined about a horizontal axis with respect to the platform in the vertical longitudinal plane.

The platform and, if necessary, the displaceable bridge arranged thereon can preferably be equipped with driven rollers and the customary control and stop means for conveying loads or load carriers, or a passenger superstructure made of lightweight material and with the conventional seating arrangement, can be attached to the platform. In the latter case, the displaceable bridge is equipped with a bellows.

The transport vehicle according to this invention will now be described more fully by reference to two illustrative embodiments as shown in the attached drawings wherein:

DETAILED DESCRIPTION OF THE DRAWINGS

Figure 1:
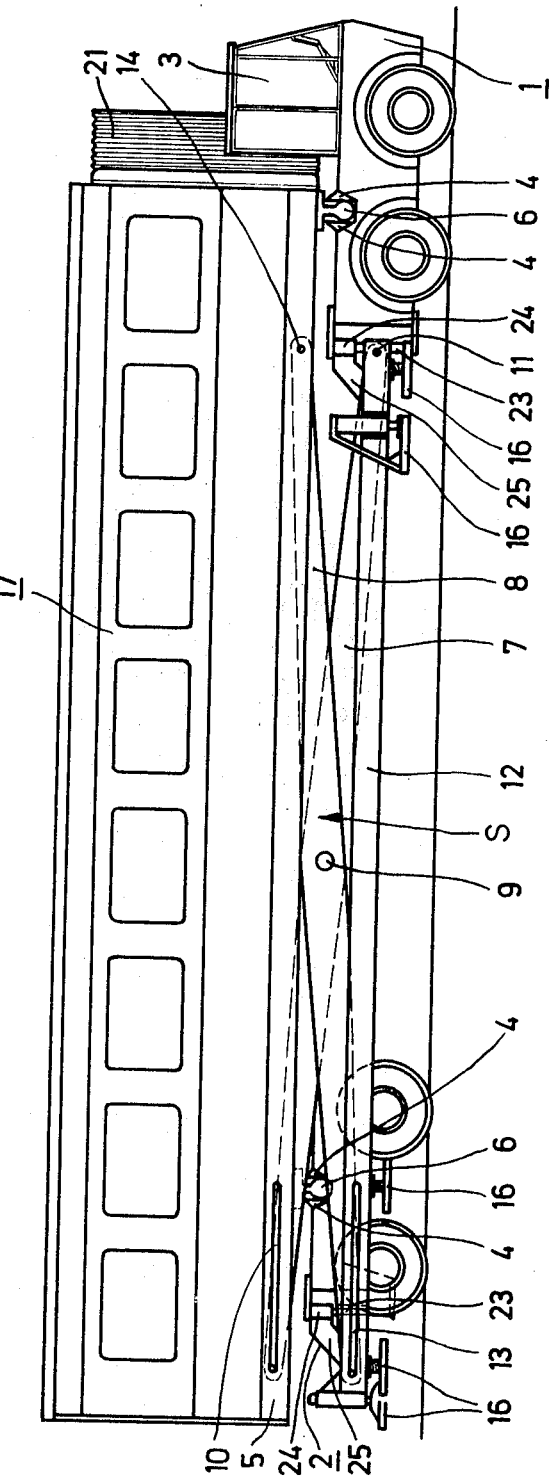
FIG. 1 is a schematic side view of a transport vehicle according to this invention designed as a passenger bus, with the platform lowered.

Referring now to the drawings, and more particularly to FIGS. 1–5, the chassis of the transport vehicle according to this invention comprises two chassis parts, one of which is illustrated as a two-axle tractor 1 and the other of which is illustrated as a two-axle steering bogie 2. A driver's cabin or compartment 3, of the tractor 1, is arranged completely on the side of the front end of the tractor, as will be seen particularly in FIGS. 2 and 4.

According to the invention, bearing jaws 4, operated preferably by a fluid pressure medium, are arranged on the top side both of the tractor 1 and of the steering bogie 2 on both sides of the vehicle (FIG. 5), and shaft journals 6 extending transversely and horizontally are secured on the underside of a platform 5 and are engageable in the bearing jaws 4 in the coupled state. These bearing jaws 4 are rounded concavely corresponding to the diameter of the shaft journals 6 on their sides facing these shaft journals in such a way that the bearing jaws 4 embrace the shaft journals 6 in their coupled relationship in the nature of tongs, thus representing readily releasable coupling means for securing the platform 5 to the chassis. This permits a limited extent of pitching motions in the coupled relationship of the chassis parts 1 and 2 relative to the platform 5.

The platform 5 is designed preferably as a torsionally stiff plate or as a torsionally stiff frame. On the platform 5 is articulated a scissors-type guide gears working downwardly, which is formed by two pairs of guide arms 7,8 held together intermediate their ends by a pivot 9. The upper free ends of the guide arms 7 are guided in longitudinal slots 10 of the platform 5, while the lower free ends thereof are articulated at 11 to horizontal longerons or elongated longitudinal members 12. The lower free ends of the guide arms 8 are guided in longitudinal slots 13 of the longerons 12, while the upper free ends thereof are articulated at 14 to the platform 5.

The operation of the guide gear 8 is effected, as usual, by fluid pressure medium drives (not shown in the drawings) in such a way that the longerons 12 bear on the roadway the platform 5 is raised, with the bearing jaws 4 detached or uncoupled from the shaft journals 6, by the reaction force of the guide gear with respect to the longerons 12 bearing on the roadway.

Figure 3:
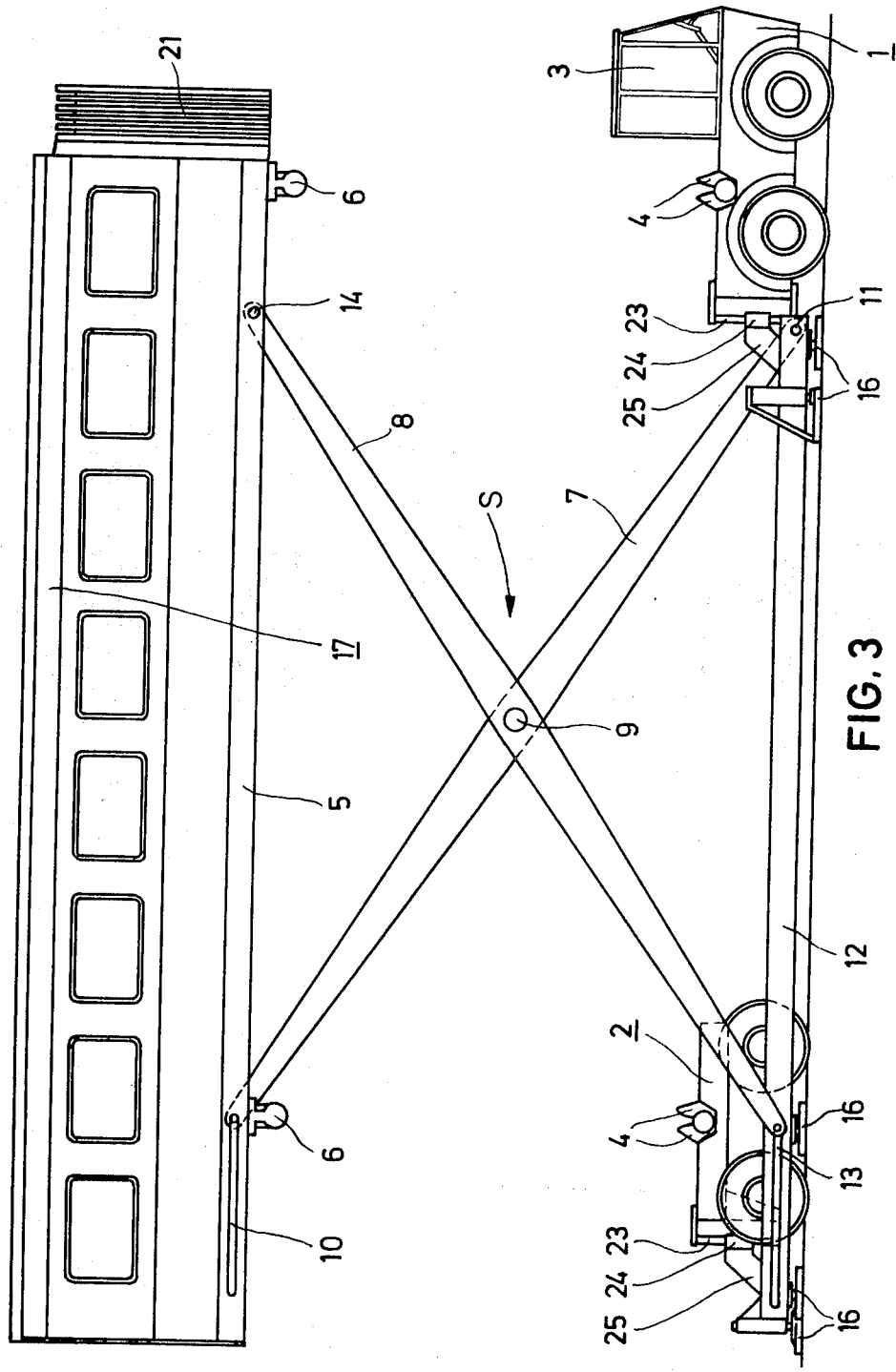
FIG. 3 is a schematic side view of the vehicle of FIGS. 1 and 2 with the platform raised.

In other words, when the platform 5 is in its lowered position (FIG. 1), the platform is coupled to the tractor 1 and bogie 2 via the jaws 4 and journals 6, with the arms 7 and 8 holding the longerons 12 in a suspended position. When the platform 5 is in its raised or elevated position as illustrated in FIG. 3, the arms allow the longerons 12 to bear upon the roadway.

Alternatively when, the guide gear s is collapsed the platform 5 moves down with respect to the longerons 12 and the shaft journals 6 of the platform can lock into the open bearing jaws 4. The fluid pressure medium pump (not shown) required to actuate the pressure medium drives operating the guide gear s is arranged preferably on the tractor 1 and connected by hoses with pressure medium lines arranged on the longerons 12, from where the pressure medium arrives again through hoses in the cylinders (not shown) of the pressure medium drives.

Since only minor relative movements take place between the longerons 12 and the tractor 1 during the extension and collapse of the guide gear s the above-mentioned hose connections can be established without any difficulty. In order to increase the lateral stability of the guide gear hinge pins 9 can be connected with each other by a strong cross-connecting pipe as shown at 15. Other cross-connections (not shown) between the guide arms 7, 8 can likewise be provided at suitable points.

The two longerons 12 can be combined at suitable points by cross-connections (not shown) thereby a rigid, possibly torsionally stiff frame. These cross-connecting elements are preferably so arranged between the two chassis parts 1 and 2 in the illustrated embodiment that these parts extend, or can be extended with the bearing jaws 4 open and the platform 5 raised, to the front or rear between the longerons 12. The guide gear s is preferably provided in this case with automatic locking means and the pressure medium hoses arranged between the tractor and the pressure medium lines provided on the longerons 12 must be detechable.

Normally, the aprons of large airports have a plain concrete cover so that sufficient rigidity of the extended guide gear s and the raised platform 5 is achieved by placing the longerons 12 on the roadway.

According to the preferred embodiment of the invention, the longerons 12 are provided in the areas 11 and 13 of the ends of the guide arms 7, 8 cooperating with them, with legs 16 actuated preferably by a pressure medium, which can only be extended and/or turned laterally to a minor extent.

As can be seen from the drawings, the guide arms 7,8 and the longerons 12 articulated to the arms can be moved up and down in the vertical planes at both sides outside the track at least of the steering bogie 2. This has the advantage that the guide gear s also has a very good rigidity and lateral stability in the extreme extended condition. The fact that the guide gear s is extended downward from the platform 5 has the advantage that, at the start of the extension operation, where the guide arms 7, 8 assume an unfavorable position with regard to the pressure medium drives driving the arms, the gravity of the guide arms and the weight of the longerons 12 help to extend the guide gear s. After the longerons 12 have set down on the roadway, the guide arms 7, 8 have already reached such a favorable position with regard to the longerons 12, the platform 5 and the pressure medium drives (not shown) that only relatively small forces are required for the further raising operation. The fact that the guide gear arms work downward from the platform 5 and move in vertical planes at both sides outside the track of at least the chassis part 2 is of advantage insofar as the entering plane, in the case of passenger transportation, and the loading plane of the lowered platform 5 in the case of freight transportation can be kept relatively low. With a corresponding design of the two chassis parts 1 and 2 even better height ratios can be achieved in practice than indicated in the drawings.

The drives for the bearing jaws 4 and the drives for operating the guide gear s are preferably operatively connected with each other and in terms of control so that an extension of the collapsed guide gear is only possible when the bearing jaws 4 have been opened first, and that closing, that is, application of the bearing jaws, is only possible when the extended guide gear has been so far collapsed that the shaft journals 6 of the platform 5 are locked fully between the open bearing jaws 4.

As indicated, FIGS. 1 to 5 show an embodiment of the vehicle according to the invention for passenger transportation.

Figure 2:
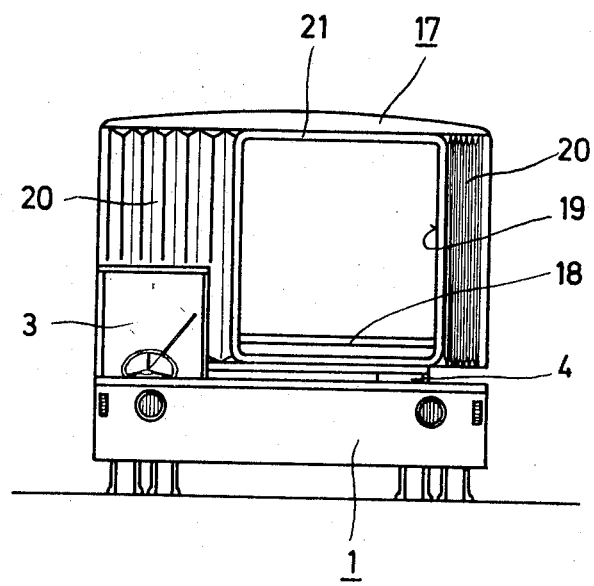
FIG. 2 is a front view of the vehicle represented in FIG. 1.
Figure 4:
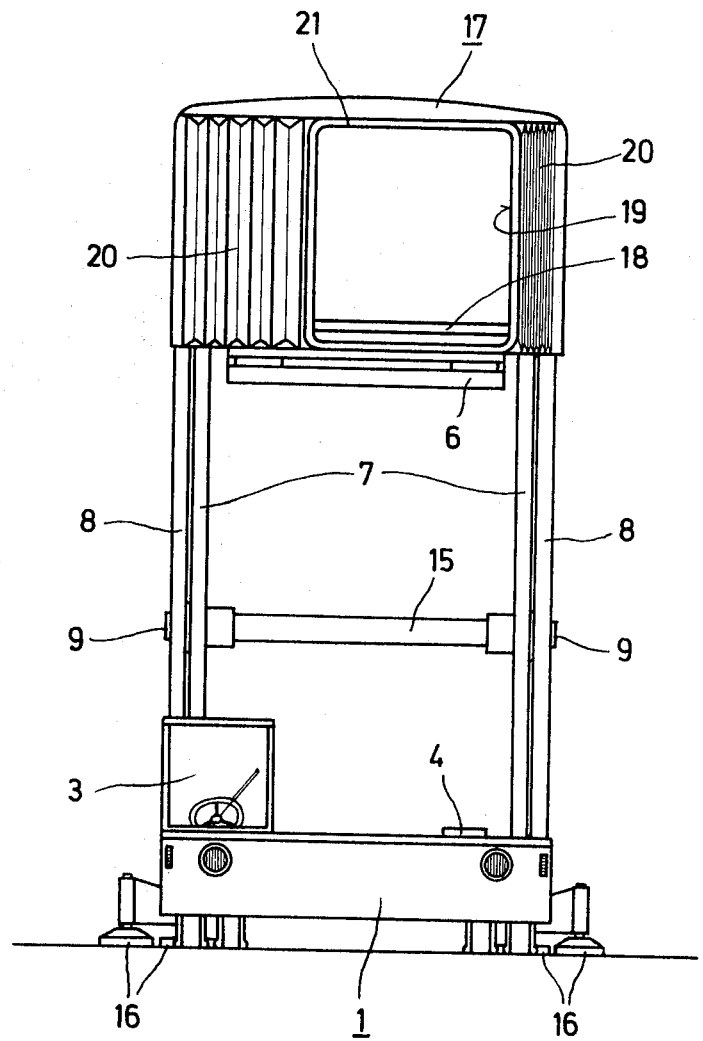
FIG. 4 is a schematic front view of the vehicle with the platform raised as in FIG. 3.
Figure 5:
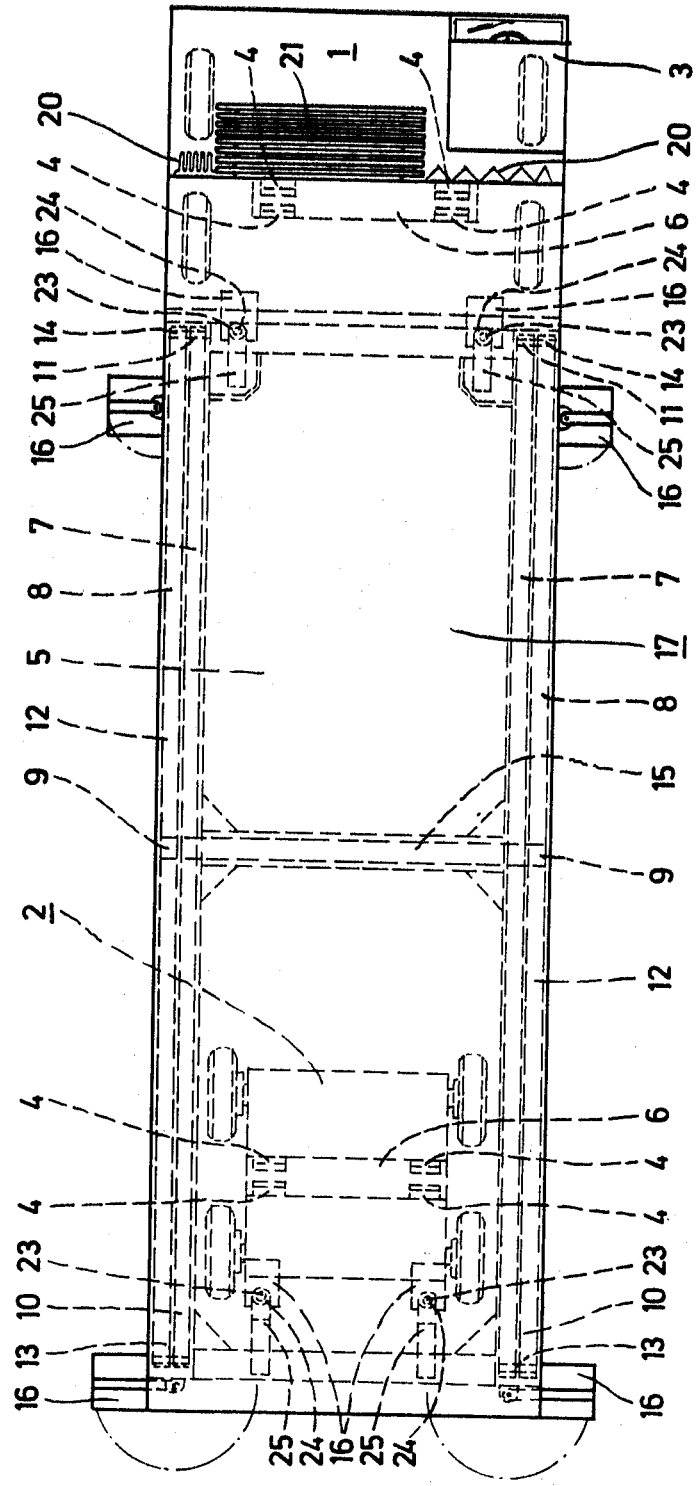
FIG. 5 is a schematic plan view of the vehicle according to this invention as represented in FIGS. 1 to 4.

To this end, a preferably light construction passenger superstructure 17 is attached on the platform 5. This passenger superstructure 17 can be provided with lateral and/or front entrance gates (not shown) which are equipped with corresponding extensible or hinged stairs or bridges. On the front side facing the airplane, the platform 5 is equipped with a bridge 18, as shown in FIGS. 2 and 4, which can be extended outwardly. This bridge 18 is provided, according to the invention, for a front side transfer gate 19 of the passenger superstructure 17 which can be displaced together with the bridge 18 in a transverse direction relative to the platform. End wall 20 of the passenger superstructure 17 assigned to the transfer gate 19 is designed as a bellows. The bridge 18 can also be so designed that it can be pivoted, if necessary, relative to the platform 5 about a vertical axis and be inclined, if necessary, about a horizontal axis relative to the platform in the vertical longitudinal plane.

According to the invention, adjoining the transfer gate 19 is arranged a long extensible bellows 21 which is so coupled with the bridge 18 that it surrounds the bridge properly in all positions and can follow all movements of the bridge 18. The lateral displacement of the transfer gate 19 relative to the longitudinal axis of the platform 5, the advance, the rotation and the inclination of the bridge 18 are effected preferably again by pressure medium drives (not shown), whose cylinders receive the pressure medium preferably through lines or hoses arranged along the guide arms 7 and 8.

Operating elements for these pressure medium drives are arranged preferably close to the transfer gate 19, so that the bridge 18 can be moved carefully to the opposite transfer gate of the airplane to be serviced, without damaging the airplane. It goes without saying that the transfer gate 19 is closed by a door (not shown) as long as the transfer has not been effected.

It can be readily seen from FIGS. 3 and 4 that the raised platform 5 with the superstructure 17 attached thereon offers a considerable surface of attack to the wind. With a lateral wind, at wind velocities of over 100 km/h, the forces for toppling the guide gear s with the raised platform 5 and the attached passenger superstructure 17 are very strong. Toppling is prevented by combining the longerons 12 preferably by cross-connections to a solid, torsionally stiff frame, arranged at both sides of the chassis 1, 2 relatively far outside the track, thus offering a very wide base for the entire arrangement.

Figure 6:
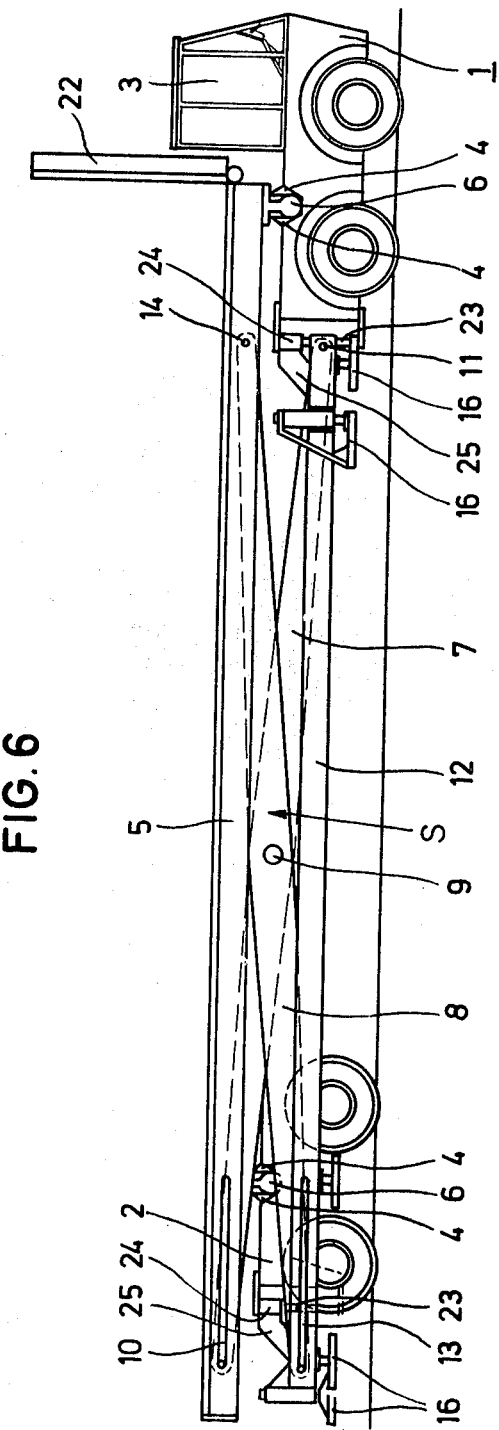
FIG. 6 is a schematic side view of a transport vehicle according to this invention modified for use as a freight truck.

FIG. 6 shows an embodiment of the present transport vehicle modified for freight transportation. It is substantially similar to the embodiment represented in FIGS. 1 to 5, and differs therefrom only in that the passenger superstructure 17 is missing and the bridge 18, which can be extended outwardly, is replaced by a hinged bridge or platform 22 preferably operated by a pressure medium. Both the platform 5 and the bridge 22 are equipped preferably with driven feed rollers together with the usual control and stop means. These parts are not represented in FIG. 6, since they are known per se and are not part of the invention.

Both in the embodiment of the transport vehicle according to FIGS. 1 to 5 and in the embodiment according to FIG. 6, vertical pins 23 can be arranged on both sides of the tractor 1 and the steering bogie 2, which cooperate with locking clamps 24 secured on arms 25 of the longerons 12. This has the effect that the two chassis parts 1 and 2 always have the correct distance from each other and from the platform 5, which is necessary for the proper locking of the shaft journals 6 into the open bearing jaws 4. If the tractor 1 and the steering bogie 2 are to extend or to be extended to the front or rear between the longerons 12, the locking clamps 24, which are preferably operated by a pressure medium, are opened for this purpose so that they release the vertical pins 23 to the front and rear. The length of the vertical pins 23 is so selected with respect to the form and length of the arms 25 that the longerons 12 can be moved easily up and down between their raised position, represented in FIGS. 1 and 6, and their lower limiting position in which they place the legs 16 on the roadway.

The invention may comprise numerous modifications and additions not described and represented here. Thus, for example, either two non-driven chassis can be used as chassis parts 1 and 2 or two driven vehicles can be provided which are operatively coupled with each other. In the former case, a special tractor must then be provided as a prime mover.

The readily releasable coupling means 4, can also have a different form and can be designed, for example, as vertical pins which cooperate with corresponding adjustable retaining jaws, preferably mounted in ball bearings.

Finally, the longerons 12 can be provided with rigid or extensible lateral extensions by which the base of the arrangement is widened, with the longerons resting on the roadway.

What is claimed is:

1. A transport vehicle for use with large airplanes for loading and unloading passengers and/or freight comprising chassis means, platform means, scissors means operatively connected to said platform means for raising and lowering said platform means relative to said chassis means, said scissor means including guide arms pivotally connected intermediate the ends thereof and having one end operatively associated with said platform means, longeron means being operatively associated with the other ends of said guide arms, said longeron means being held in spaced relation from a roadway when said guide arms are in collapsed relationship and said platform means rests on said chassis means, and said longeron means bearing on the roadway when said guide arms are in extended relationship and said platform means is spaced from said chassis means, and readily releasable coupling means for securing said platform means to said chassis means.

2. The vehicle according to claim 1 wherein said longeron means are movable in vertical planes arranged at both sides of said chassis means.

3. The vehicle according to claim 1, further including horizontal cross-bars connecting said longeron means with each other to form a torsionally-stiff frame.

4. The vehicle according to claim 3 wherein said chassis means includes two chassis parts, and said cross-bars connecting said longeron means with each other being arranged between said chassis parts such that the latter can drive out or be driven out forwardly and rearwardly between said longeron means with the longeron means resting on the roadway and said platform means raised.

5. The vehicle according to claim 4, further including pin means arranged on both of said chassis parts, pressure-actuated locking clamp means being secured on said longeron means, said pin means and clamp means cooperating to maintain said chassis parts and platform means in a position relative to each other to insure a proper locking of said readily releasable coupling means when said platform means is lowered relative to said chassis means.

6. The vehicle according to claim 1 wherein said longeron means is provided with legs which can be extended downward and turned laterally to compensate for unevenness of the roadway when said longeron means bears on the roadway.

7. The vehicle according to claim 1 wherein said chassis means includes two chassis parts, and wherein at least one of said chassis parts is driven.

8. The vehicle according to claim 7 wherein one of said chassis parts is a tractor and the other part a steering bogie.

9. The vehicle according to claim 1 wherein said readily releasable coupling means includes shaft journals extending horizontally in a transverse direction to the vehicle and carried by one of said chassis means or said platform means, and bearing jaws carried by the other of said chassis means or said platform means for embracing said shaft journals.

10. The vehicle according to claim 9 wherein said readily releasable coupling means includes a connection with said scissor means for automatically disengaging said readily releasable coupling means before said scissors means are extended and for engaging automatically said coupling means after said scissors have been collapsed.

11. The vehicle according to claim 1 wherein said platform means comprises a self-supporting torsionally stiff plate.

12. The vehicle according to claim 11, further including bridge means carried by one side of said platform means, and means for extending said bridge means outwardly relative to said platform means.

13. The vehicle according to claim 12 further including means for moving said bridge means relative to said platform means to displace the same in a transverse direction relative to said platform means and to turn the same about a vertical axis and incline the same about a horizontal axis relative to said platform means.

14. The vehicle according to claim 12 further including driven roller means and control and stop means carried by said platform means and bridge means for transporting loads or load carriers.

15. The vehicle according to claim 12 further including bellows means operatively associated with said bridge means.

16. The vehicle according to claim 1 further including a lightweight passenger superstructure including passenger seats carried by said platform means.

* * * * *